Nov. 23, 1954  D. WHEATLEY ET AL  2,695,382
ELECTRICAL DOOR-ACTUATING APPARATUS
Filed June 29, 1951
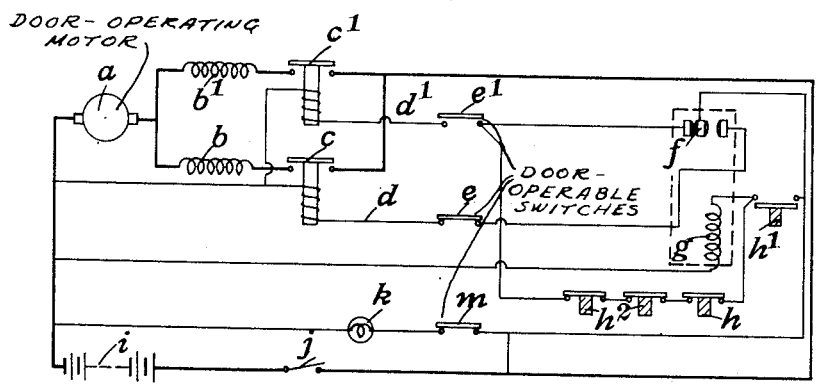
Inventors
D. Wheatley
S. Adams
By [signature]
Attys.

United States Patent Office 2,695,382
Patented Nov. 23, 1954

2,695,382

ELECTRICAL DOOR-ACTUATING APPARATUS

Denis Wheatley, New Malden, and Stanley Adams, Acton, London, England, assignors to C. A. V. Limited, London, England Application June 29, 1951, Serial No. 234,292

Claims priority, application Great Britain August 1, 1950

1 Claim. (Cl. 318—266)

This invention relates to electrical apparatus for actuating vehicle or other doors, and has for its object to enable automatic control of a door-actuating motor to be effected in a simple and reliable manner.

The invention comprises the combination with a reversible electric motor having a pair of oppositely acting field windings, of a system which includes an electromagnetically operable motor-controlling switch in series with each field winding, a door-operable switch in series with the winding of each of the said motor-controlling switches, an electromagnetically operable two-way switch controlling the parts of the system containing the said door-operable switches and the associated motor-controlling switches, and push-button switches controlling the circuit of the winding of the two-way switch.

The accompanying diagram illustrates one embodiment of the invention.

Referring to the diagram, the electric motor $a$ employed for actuating the door is of the series type having a pair of oppositely-acting field windings $b$, $b^1$, motion for effecting closing of the door being obtained when current flows through one of the said windings, and motion for opening the door being obtained when current flows through the other winding.

For controlling the motor in accordance with the invention an electromagnetically operable switch is provided in series with each of the said field windings, the switches being respectively indicated by $c$, $c^1$, and in parallel with the motor are provided two circuits $d$, $d^1$ each containing the winding of the associated field-winding switch, and a spring loaded switch $e$, $e^1$ which is openable against the action of its spring by the door. When the door is closed the switch $e$ is closed and the switch $e^1$ is open, and vice versa. The two circuits $d$, $d^1$ are controlled by an electromagnetically operable two-way switch $f$, the winding $g$ of which is controlled by a pair of push button-switches $h$, $h^1$, the switch $h$ being normally closed, and the switch $h^1$ normally open. Also in the same circuit as the switch $h$ may be arranged if desired one or more emergency push button switches $h^2$, these being normally closed and situated in any desired part of the vehicle. Current is supplied to the system from any convenient D. C. source, such as a battery $i$, under the control of a master-switch $j$. Also there may be provided a warning-signal lamp $k$ under the control of a switch $m$ which is operable by the door. Closure of the door causes closure of the switch $m$ which causes the warning-lamp $k$ to be brought into action for indicating that the door is closed.

The mode of action of the system is as follows:

The diagram shows the condition of the system when the door is closed. In this condition current flows through the winding $g$ and holds the two-way switch $f$, which is spring biased to the right, in the position shown. But no current passes through the motor. To open the door the switch $h$ (or either of the emergency switches $h^2$) is opened. This interrupts the current in $g$ and allows the intermediate movable contact of the switch $f$ to move to its right-hand position under the action of a spring. Current can now flow through the switches $f$, $e$ and the winding of the switch $c$, causing the latter to be closed and the motor set in motion. On reaching its open position, the door opens the switch $e$ and so brings the motor to rest; also it closes the switch $e^1$.

To re-close the door, the switch $h^1$ is closed. This causes current to flow through $g$ for moving the movable contact of the switch $f$ to its left-hand position, so causing the switch $c^1$ to close, (the switch $e^1$ being already closed). The motor now moves in the opposite direction. When the door is closed, it opens the switch $e^1$ and so brings the motor to rest. Also it closes the switch $e$ in readiness for the next door-opening action. Meanwhile current continues to pass through $g$ by way of the switch $f$ after the switch $h^1$ has been released.

By this invention a system especially suited for automatically actuating vehicle doors, is provided in a simple and reliable form. The invention may, however, be applied in essentially the same manner to other doors, such as garage doors. Moreover, the invention is not restricted to the example above described. Thus, if more convenient, the switching arrangement may be such that the circuit through the winding $g$ is open when the door is closed, and is closed only when the door is open.

Having thus described our invention what we claim as new and desire to secure by Letters Patent is:

An electrical door-actuating system comprising in combination a reversible electric motor having a pair of oppositely acting field windings, a pair of electromagnetically operable motor-controlling switches each having an operating winding, a pair of door-operable switches, a first electric circuit in which one of the field windings and one of the motor-controlling switches are arranged in series, a second electric circuit in which the other of the field windings and the other of the motor-controlling switches are arranged in series, a third electric circuit in which one of the door-operable switches and the operating winding of one of the motor-controlling switches are arranged in series, a fourth electric circuit in which the other door-operable switch and the operating winding of the other motor-controlling switch are arranged in series, an electromagnetically operable two-way switch having an operating winding and a spring-loaded contact which is movable between first and second positions for alternately establishing the third and fourth circuits, the said contact being movable by its spring loading into its first position, and by energisation of its operating winding into its second position, a fifth electric circuit which contains the operating winding of the two-way switch, and which is closed by the two-way switch when the spring-loaded contact thereof occupies its second position, a push-button switch for closing the fifth circuit when the spring-loaded contact of the two-way switch occupies its first position, and at least one other push-button switch for interrupting the fifth circuit when the spring-loaded contact of the two-way switch occupies its second position.

References Cited in the file of this patent

UNITED STATES PATENTS

| Number | Name | Date |
|---|---|---|
| 1,839,934 | Stansbury | Jan. 5, 1932 |
| 1,951,835 | Morris | Mar. 20, 1934 |
| 2,435,440 | Graham | Feb. 3, 1948 |
| 2,502,167 | Moore | Mar. 28, 1950 |
| 2,534,751 | Barrows | Dec. 19, 1950 |
| 2,572,785 | Vaughn | Oct. 23, 1951 |